United States Patent
He et al.

(10) Patent No.: US 12,502,979 B2
(45) Date of Patent: Dec. 23, 2025

(54) CONTROLLING THE TORQUE OUTPUT OF AN ELECTRIC MOTOR TO MITIGATE GEAR RATTLE

(71) Applicant: GM GLOBAL TECHNOLOGY OPERATIONS LLC, Detroit, MI (US)

(72) Inventors: Song He, Troy, MI (US); Vinod Chowdary Peddi, Shelby Township, MI (US); Kerrie Marie Spaven, Rochester Hills, MI (US); Brent Steven Gagas, Pleasant Ridge, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 160 days.

(21) Appl. No.: 18/543,331

(22) Filed: Dec. 18, 2023

(65) Prior Publication Data
US 2025/0196654 A1 Jun. 19, 2025

(51) Int. Cl.
*B60L 15/02* (2006.01)
*B60L 15/20* (2006.01)

(52) U.S. Cl.
CPC ......... *B60L 15/20* (2013.01); *B60L 2240/421* (2013.01); *B60L 2240/423* (2013.01); *B60L 2270/142* (2013.01)

(58) Field of Classification Search
CPC ............... B60L 15/02; B60L 2240/421; B60L 2240/423; B60L 2270/142
See application file for complete search history.

(56) References Cited

U.S. PATENT DOCUMENTS

| | | | | |
|---|---|---|---|---|
| 12,291,108 B2* | 5/2025 | Oguro | ...................... | B60L 15/36 |
| 2014/0162835 A1* | 6/2014 | Gotoda | ................ | B60W 10/08 |
| | | | | 180/65.265 |
| 2015/0321659 A1* | 11/2015 | Sato | ........................ | B60K 6/24 |
| | | | | 903/905 |

FOREIGN PATENT DOCUMENTS

| CN | 116176290 A | 5/2023 |
|---|---|---|
| JP | 2013189170 A | 9/2013 |

OTHER PUBLICATIONS

DE Office Action for Appln No. 10 2024 103 342.8 dated Sep. 4, 2024, 6 pages.

* cited by examiner

*Primary Examiner* — Tan Q Nguyen
(74) *Attorney, Agent, or Firm* — CANTOR COLBURN LLP

(57) ABSTRACT

Embodiments include a method for controlling a torque of an electric motor. The method includes receiving a requested output torque for the electric motor and obtaining a rotational speed of the electric motor. Based on determining that the rotational speed of the electric motor is within a predefined range, the method includes instructing the electric motor to operate at the requested output torque based on determining that the requested output torque is greater than a first threshold or less than a second threshold, instructing the electric motor to operate with a torque that is at least the first threshold based on determining that the requested output torque is less than the first threshold and greater than zero, and instructing the electric motor to operate with the torque that is at most the second threshold based on determining that the requested output torque is greater than the second threshold.

17 Claims, 6 Drawing Sheets

CONTROLLING THE TORQUE OUTPUT OF AN ELECTRIC MOTOR TO MITIGATE GEAR RATTLE

INTRODUCTION

The disclosure relates to controlling the torque output of an electric motor. More specifically, the disclosure relates controlling the torque output of an electric motor in an electric vehicle to reduce gear rattle.

In general, gear rattle is an undesirable sound created by impacting unloaded gear mesh pairs within a transmission. Gear rattle sounds like a light knocking or growling sound and can occur due to a separation and resulting impact of the gear teeth. In some cases, the impact of the intermeshing gear teeth is transmitted through the shafts and amplified by the housing, creating an undesirable noise that can be observed in the passenger cabin of the vehicle. In electric vehicles, the presence of gear rattle is often more noticeable due to the lack of the sound of the operation of an internal combustion engine to mask the sound of gear rattle.

SUMMARY

In one exemplary embodiment, a method for controlling torque output of an electric motor is provided. The method includes receiving a requested output torque level for the electric moto and obtaining a rotational speed of the electric motor. Based on determining that the rotational speed of the electric motor is within a predefined range the method includes instructing the electric motor to operate at the requested output torque level based on determining that the requested output torque level is greater than a first threshold level or less than a second threshold level, instructing the electric motor to operate with a torque level that is at least the first threshold level based on determining that the requested output torque level is less than the first threshold level and greater than zero, and instructing the electric motor to operate with the torque level that is at most the second threshold level based on determining that the requested output torque level is greater than the second threshold level and less than zero.

In addition to the one or more features described herein the first threshold level is greater than one Newton meter and the second threshold level is less than negative one Newton meter.

In addition to the one or more features described herein an absolute value of the first threshold level is equal to the absolute value of the second threshold level.

In addition to the one or more features described herein the method further includes instructing the electric motor to operate at the torque level equal to the requested output torque level based on determining that the rotational speed of the electric motor is not within the predefined range.

In addition to the one or more features described herein the method further includes monitoring the requested output torque level for the electric motor and preventing the electric motor from operating at the torque level that is lower than the first threshold level until the requested output torque level falls below a third threshold level, which is less than the second threshold level, based on a determination that the electric motor has been instructed to operate at the torque that is at least the first threshold level.

In addition to the one or more features described herein the method further includes monitoring the requested output torque level for the electric motor and preventing the electric motor from operating at the torque level that is greater than the second threshold level until the requested output torque level is greater than a fourth threshold level, which is greater than the first threshold level, based on a determination that the electric motor has been instructed to operate at the torque that is at most the second threshold level.

In addition to the one or more features described herein the fourth threshold level is at least one Newton meter greater than the first threshold level.

In one exemplary embodiment, an electric vehicle is provided. The electric vehicle includes an electric motor, a plurality of gears that couple the electric motor to one or more wheels, and a controller configured to operate the electric motor. The controller is configured to receive a requested output torque level for the electric motor and obtain a rotational speed of the electric motor. Based on determining that the rotational speed of the electric motor is within a predefined range, the controller is further configured to instruct the electric motor to operate at the requested output torque level based on determining that the requested output torque level is greater than a first threshold level or less than a second threshold level, instruct the electric motor to operate with a torque level that is at least the first threshold level based on determining that the requested output torque level is less than the first threshold level and greater than zero, and instruct the electric motor to operate with the torque level that is at most the second threshold level based on determining that the requested output torque level is greater than the second threshold level and less than zero.

In addition to the one or more features described herein the first threshold level is greater than one Newton meter and the second threshold level is less than negative one Newton meter.

In addition to the one or more features described herein an absolute value of the first threshold level is equal to the absolute value of the second threshold level.

In addition to the one or more features described herein the controller is further configured to instruct the electric motor to operate at the torque level equal to the requested output torque level based on determining that the rotational speed of the electric motor is not within the predefined range.

In addition to the one or more features described herein the controller is further configured to monitor the requested output torque level for the electric motor and prevent the electric motor from operating at the torque level that is lower than the first threshold level until the requested output torque level falls below a third threshold level, which is less than the second threshold level, based on a determination that the electric motor has been instructed to operate at the torque that is at least the first threshold level.

In addition to the one or more features described herein the third threshold level is at least one Newton meter less than the second threshold level.

In addition to the one or more features described herein the controller is further configured to monitor the requested output torque level for the electric motor and prevent the electric motor from operating at the torque level that is greater than the second threshold level until the requested output torque level is greater than a fourth threshold level, which is greater than the first threshold level, based on a determination that the electric motor has been instructed to operate at the torque that is at most the second threshold level.

In addition to the one or more features described herein the fourth threshold level is at least one Newton meter greater than the first threshold level.

In one exemplary embodiment, a method for controlling torque output of an electric motor is provided. The method includes receiving a requested output torque level for the electric motor and obtaining a speed of the electric vehicle. Based on determining that the speed of the electric vehicle is within a predefined range, the method includes instructing the electric motor to operate at the requested output torque level based on determining that the requested output torque level is greater than a first threshold level or less than a second threshold level, instructing the electric motor to operate with a torque level that is at least the first threshold level based on determining that the requested output torque level is less than the first threshold level and greater than zero, and instructing the electric motor to operate with the torque level that is at most the second threshold level based on determining that the requested output torque level is greater than the second threshold level and less than zero.

In addition to the one or more features described herein the method also includes instructing the electric motor to operate at the torque level equal to the requested output torque level based on a determination that the speed of the electric vehicle is not within the predefined range.

In addition to the one or more features described herein the method also includes monitoring the requested output torque level for the electric motor and preventing the electric motor from operating at the torque level that is lower than the first threshold level until the requested output torque level falls below a third threshold level, which is less than the second threshold level, based on a determination that the electric motor has been instructed to operate at the torque that is at least the first threshold level.

In addition to the one or more features described herein the method also includes monitoring the requested output torque level for the electric motor and preventing the electric motor from operating at the torque level that is greater than the second threshold level until the requested output torque level is greater than a fourth threshold level, which is greater than the first threshold level, based on a determination that the electric motor has been instructed to operate at the torque that is at most the second threshold level.

The above features and advantages, and other features and advantages of the disclosure are readily apparent from the following detailed description when taken in connection with the accompanying drawings.

BRIEF DESCRIPTION OF THE DRAWINGS

Other features, advantages, and details appear, by way of example only, in the following detailed description, the detailed description referring to the drawings in which.

DETAILED DESCRIPTION

Figure 1:
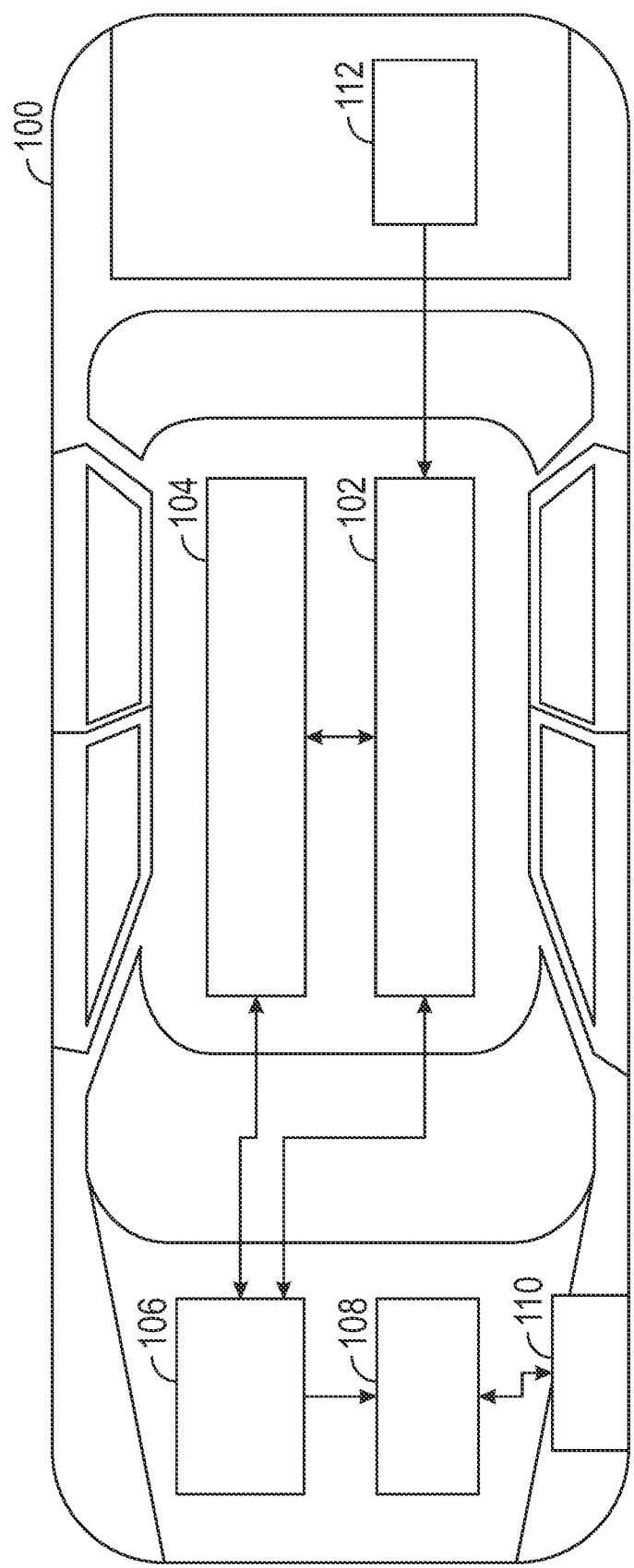
FIG. 1 is a schematic diagram of an electric vehicle in accordance with an exemplary embodiment.

The following description is merely exemplary in nature and is not intended to limit the present disclosure, its application or uses. Various embodiments of the disclosure are described herein with reference to the related drawings. Alternative embodiments of the disclosure can be devised without departing from the scope of the claims. Various connections and positional relationships (e.g., over, below, adjacent, etc.) are set forth between elements in the following description and in the drawings. These connections and/or positional relationships, unless specified otherwise, can be direct or indirect, and the present disclosure is not intended to be limiting in this respect. Accordingly, a coupling of entities can refer to either a direct or an indirect coupling, and a positional relationship between entities can be a direct or indirect positional relationship.

Turning now to an overview of the aspects of the disclosure, embodiments of the disclosure include methods and systems for controlling the torque output of an electric motor in an electric vehicle to reduce gear rattle. In exemplary embodiments, gear rattle in an electric vehicle is reduced by selectively preventing the electric motor from operating with an output torque level that is within a predefined torque band. In exemplary embodiments, the operation of the electric motor with an output torque level within the predefined torque band is minimized when the rotational speed of the electric motor, or an operating speed of the electric vehicle, is within a predefined range.

In exemplary embodiments, the predefined range of the rotational speed of the electric motor or the operating speed of the electric vehicle is determined based on the operational characteristics of the electric vehicle and includes speeds that correspond to elevated levels of gear rattle. In exemplary embodiments, the predefined torque band includes output torque levels that are between a first and a second threshold level. In one embodiment, the absolute value of the first threshold level is equal to the absolute value of the second threshold level. In one example, the first threshold level is two Newton meters and the second threshold level is negative two Newton meters. In exemplary embodiments, preventing the output torque of the electric motor from being within a predefined torque band reduces gear rattle by ensuring a sufficient output torque to maintain contact between the gears that are used to transmit rotational energy between the electric motor and the wheels of the electric vehicle. In exemplary embodiments, the first and second threshold values are determined and specified based on different gear rattle conditions observed in an electric vehicle.

Referring now to FIG. 1, a schematic diagram of an electric vehicle 100 according to one or more embodiments is shown. The electric vehicle 100 includes a controller 102, a battery pack 104, an electric motor 106, gears 108, one or more wheels 110, and a plurality of sensors 112. In exemplary embodiments, the electric motor 106 is mechanically coupled to wheels 110 of the electric vehicle 100 via two or more gears 108. The electric motor 106 is configured to provide propulsion to the electric vehicle 100, via the gears 108, by drawing power from the battery pack 104.

In exemplary embodiments, the battery pack 104 includes a plurality of battery cells, for example, lithium-ion batteries. In exemplary embodiments, the controller 102 is one of a general-purpose processor, a Field programmable gate array (FPGA), an application-specific integrated circuit (ASIC), or the like. The plurality of sensors 112 include sensors that are configured to measure one or more of the rotational speed of an electric motor 106 and the speed of the electric vehicle 100. In exemplary embodiments, the sensors 112 also include sensors that are configured to receive input, such as a desired torque level, from an operator of the electric vehicle 100, such as input from an accelerator or a brake pedal.

In exemplary embodiments, the controller 102 is configured to monitor the sensors 112 and to responsively control the electric motor 106. For example, the controller 102 is configured to command the electric motor 106 to operate with an output torque level. In exemplary embodiments, the controller 102 receives a desired torque output level from one or more sensors 112 and responsively instructs the electric motor 106 to generate an output torque. In exemplary embodiments, the controller 102 is configured to determine the output torque level for the electric motor 106 to minimize a gear rattle, (i.e., intermittent impact between the gears 108).

Figure 2:
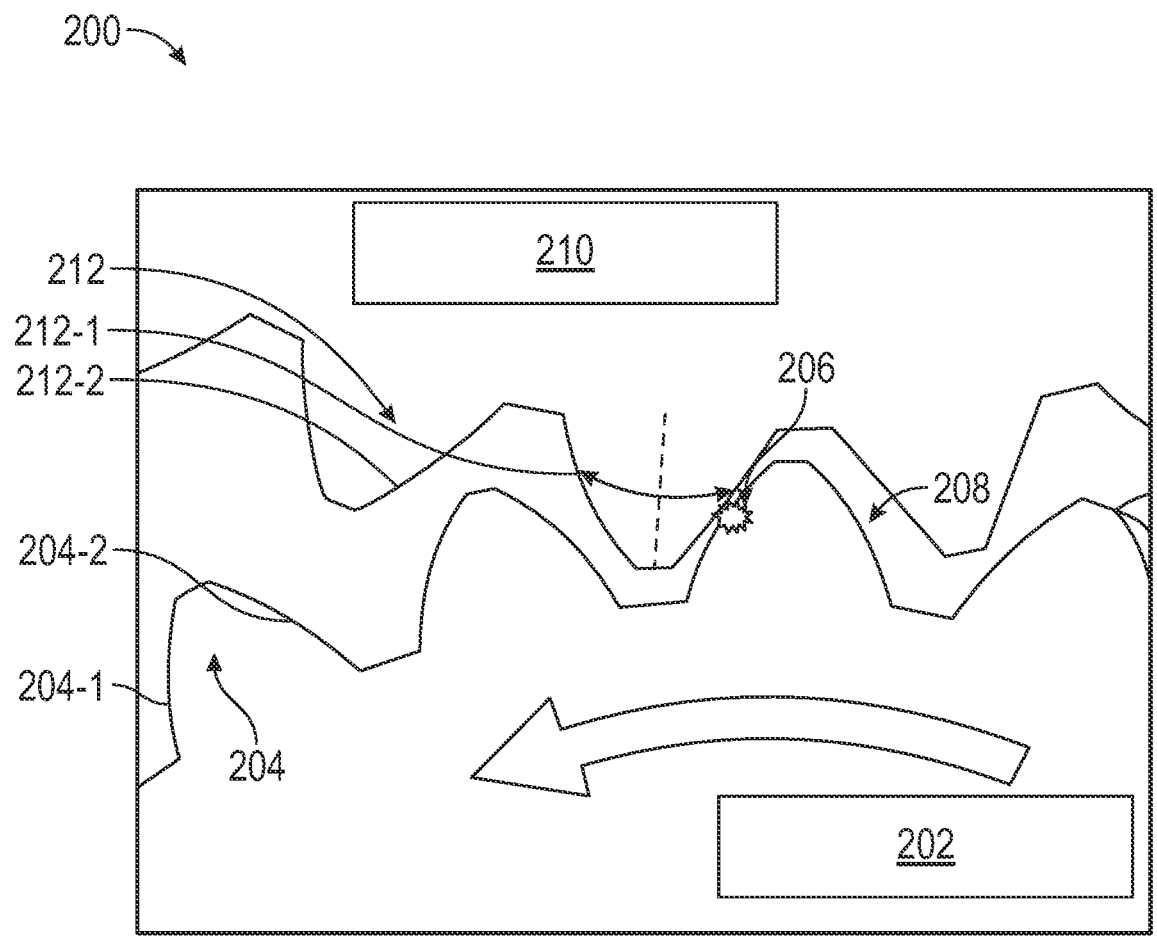
FIG. 2 is a diagram of a portion of a transmission of an electric vehicle in accordance with an exemplary embodiment.

Referring now to FIG. 2, a diagram of a portion of a transmission 200 of an electric vehicle is shown. The transmission 200 includes a drive gear 202 that is mechanically coupled to an electric motor and an output gear 210 that is mechanically coupled to the wheel of the electric vehicle. As illustrated, the drive gear includes a plurality of teeth 204 that each includes a first surface 204-1 and a second surface 204-2. The output gear 210 includes a plurality of teeth 212 that each include a first surface 212-1 and a second surface 212-2. During operation, as the drive gear 202 rotates, the first surface 204-1 of one of the teeth 204 of the drive gear 202 is in contact 206 with a second surface 212-2 of one of the teeth 212 of the output gear 210. In addition, a gap 208 is disposed between the teeth 204 of the drive gear 202 and the teeth 212 of the output gear 210 between the second surface 204-2 and the first surface 212-1 of the teeth 204, 212.

When the applied motor torque is small enough, (i.e., between the first threshold level and the second threshold level), the torque may not be sufficient to suppress dynamic oscillations in the geartrains which can be caused by small but random events. As a result, the output gear 210 may spin freely, which can cause impacts with the drive gear 202, causing rattle noise. Such phenomenon can happen on either side of the gear rotation directions, corresponding to both positive and negative motor torque conditions. In one example, when the output torque level of the electric motor is below a threshold level, the output gear 210 may spin causing the teeth 212 of the output gear 210 to close the gap 208, which may result in an impact between the second surface 204-2 and the first surface 212-1 of the teeth 204, 212, causing gear rattle. In exemplary embodiments, gear rattle is reduced by ensuring that drive gear 202 is operated with a sufficient output torque level to maintain a desired contact 206 between the teeth 204 of the drive gear 202 and the teeth 212 of the output gear 210, thereby preventing undesired impact between the second surface 204-2 of the teeth 204 of drive gear 202 and the first surface 212-1 of the teeth 212 of the output gear 210.

Figure 3:
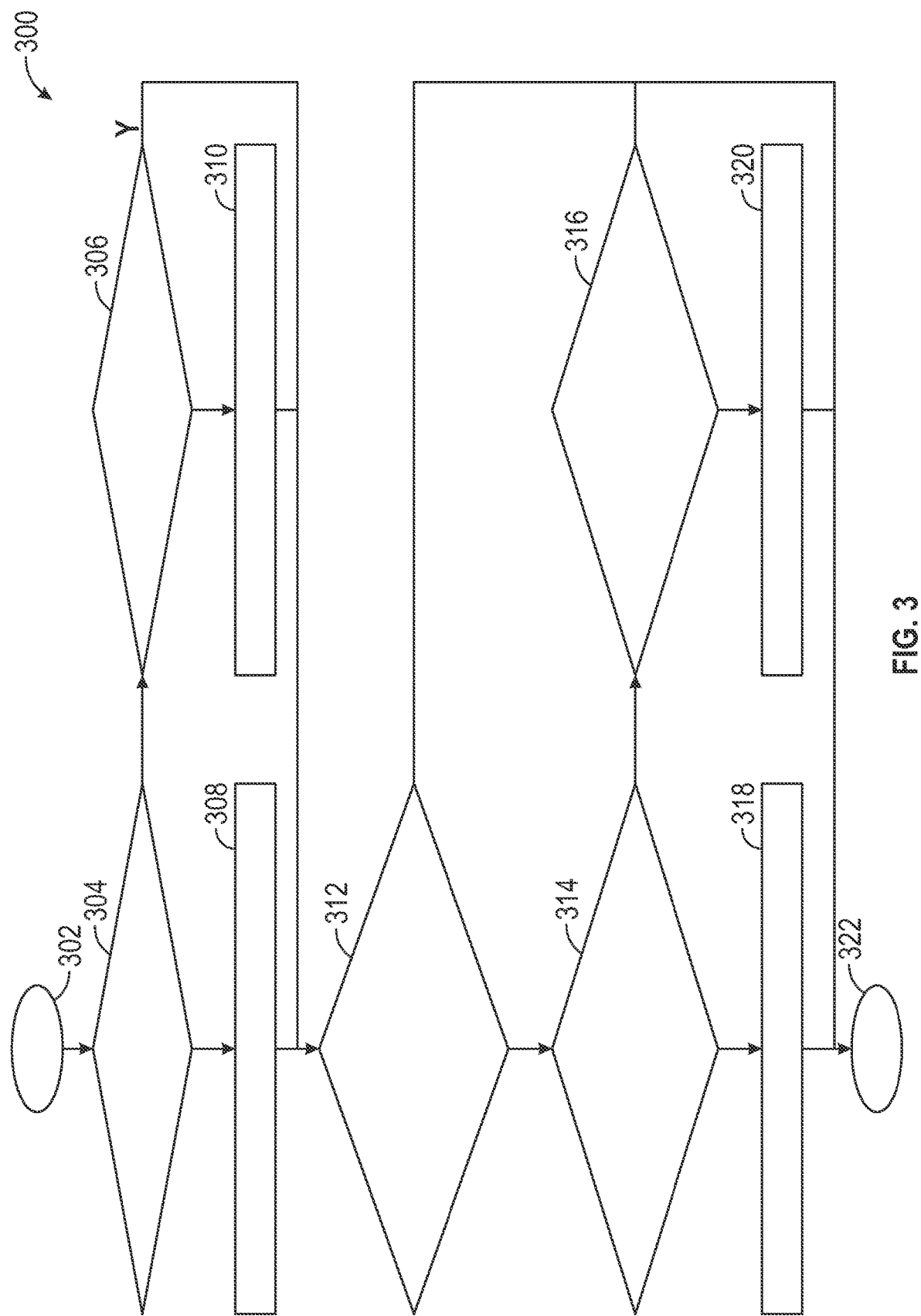
FIG. 3 is a flowchart illustrating a method for controlling the torque output of an electric motor in accordance with an exemplary embodiment.

Referring now to FIG. 3, a flowchart illustrating a method 300 for controlling the torque output of an electric motor in accordance with an exemplary embodiment is shown. The method 300 begins at block 302. At decision block 304, a determination is made whether a requested output torque level is greater than a positive high torque threshold, also referred to herein as a fourth threshold torque level. Based on a determination that the requested output torque level is not greater than the fourth threshold torque level, the method 300 proceeds to block 308. At block 308, the method 300 includes setting a torque hysteresis flag to a value of TRUE.

Based on a determination that the requested output torque level is greater than the fourth threshold torque level, the method 300 proceeds to decision block 306. At decision block 306, a determination is made whether a requested output torque level is less than a negative high torque threshold, also referred to herein as a third threshold torque level. Based on a determination that the requested output torque level is less than the third threshold torque level, the method 300 proceeds to decision block 312. Based on a determination that the requested output torque level is not less than the third threshold torque level, the method 300 proceeds to block 310. At block 310, the method 300 includes setting a torque hysteresis flag to a value of FALSE.

At decision block 312, the method 300 includes determining whether the rotational speed of the electric motor is within a predefined range. Based on a determination that the rotational speed of the electric motor is not within a predefined range, the method 300 proceeds to block 322 and the method 300 ends. Based on a determination that the rotational speed of the electric motor is within a predefined range, the method 300 proceeds to decision block 314. At decision block 314, the method 300 includes determining whether the torque hysteresis flag is set to TRUE and the requested output torque level is less than the first threshold torque level. Based on a determination that the torque hysteresis flag is set to TRUE and the requested output torque level is less than the first threshold torque level, the method 300 proceeds to block 318. At block 318, the method 300 includes setting an output torque level of the electric motor to the first threshold level.

Based on a determination that the torque hysteresis flag is not set to TRUE or the requested output torque level is greater than the first threshold torque level, the method 300 proceeds to decision block 316. At decision block 316, the method 300 includes determining whether the torque hysteresis flag is set to FALSE and the requested output torque level is greater than a second threshold torque level. Based on a determination that the torque hysteresis flag is not set to FALSE or that the requested output torque level is less than a second threshold torque level, the method 300 proceeds to block 320. At block 320, the method 300 includes setting an output torque level of the electric motor to the second threshold level.

Figure 4:
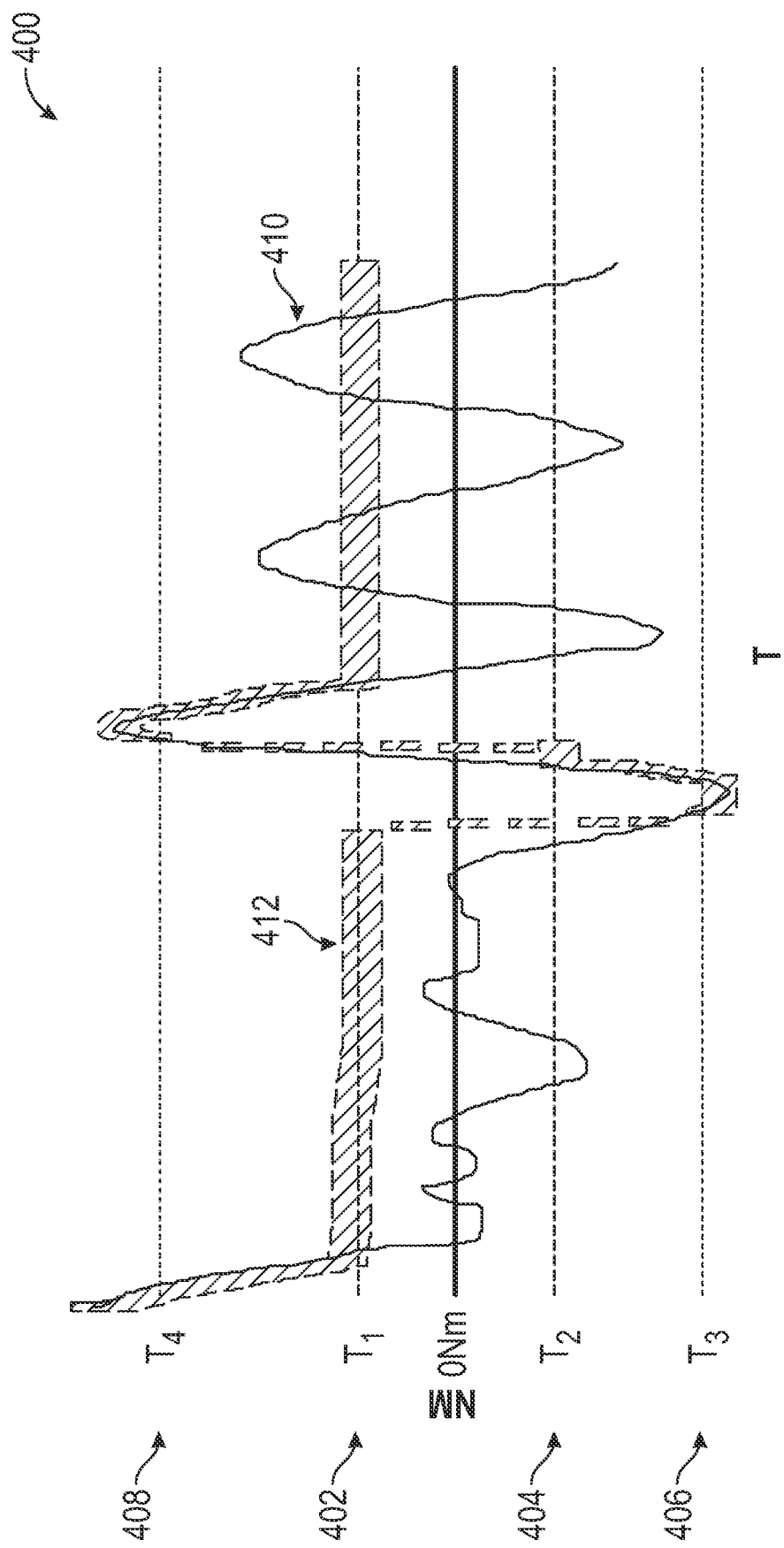
FIG. 4 is a graph illustrating a requested torque level and an output torque level in accordance with an exemplary embodiment.

Referring now to FIG. 4, a graph 400 that illustrates a relationship between the requested torque level 410 and the output torque level 412 in accordance with an exemplary embodiment is shown. In exemplary embodiments, a controller, such as the one shown in FIG. 1, is configured to receive the requested torque level 410 and to responsively instruct an electric motor to provide the output torque level 412. In exemplary embodiments, the controller is further configured to determine the output torque level 412 based on one or more of the rotational speed of the electric motor and the speed of the electric vehicle. In exemplary embodiments, the controller is configured to prevent the output torque level 412 of the electric motor from being between a first threshold level (T1) 402 and a second threshold level (T2) 404. In one embodiment, the absolute value of the first threshold level (T1) 402 is equal to the second threshold level (T2) 404.

In exemplary embodiments, when the requested torque level 410 is above the first threshold level (T1) 402, the controller instructs the electric motor to provide an output torque level 412 that is equal to the requested torque level 410. Once the requested torque level 410 falls below the first threshold level (T1) 402, the controller instructs the electric motor to provide an output torque level 412 that is equal to the first threshold level (T1) until the absolute valve of requested torque level 410 exceeds a third threshold level (T3) 406 in the opposite motor torque region. Once the requested torque level 410 falls below the third threshold level (T3) 406, the controller instructs the electric motor to provide an output torque level 412 that is equal to the requested torque level 410. Likewise, once the requested torque level 410 exceeds the second threshold level (T2) 404, the controller instructs the electric motor to provide an output torque level 412 that is equal to the third threshold level (T2) 404 until the absolute valve of requested torque level 410 exceeds a fourth threshold level (T4) 408 in the opposite motor torque region.

In exemplary embodiments, the fourth threshold level (T4) 408 is greater than the first threshold level (T1) 402 and the third threshold level (T3) 406 is less than the second threshold level (T2) 404, i.e., the magnitude of the third threshold (T3) 406 is higher than the second threshold level (T2) 404. In exemplary embodiments, the difference between the fourth threshold level (T4) 408 and the first threshold level (T1) 402 and the difference between the third threshold level (T3) 406 and the second threshold level (T2) 404 is configured to prevent the output torque level 412 from alternating between the first threshold level (T1) 402 and the second threshold level (T2) 404.

In one embodiment, the first threshold level (T1) 402 has a value of two Newton meters, the second threshold level (T2) 404 has a value of negative two Newton meters, the third threshold level (T3) 406 has a value of negative three Newton meters, and the fourth threshold level (T4) 408 has a value of three Newton meters. In exemplary embodiments, the fourth threshold level (T4) 408 is at least one Newton meter greater than the first threshold level (T1) 402, and the third threshold level (T3) 406 is at least one Newton meter less than the second threshold level (T2) 404. In exemplary embodiments, the magnitude of the value of the first threshold level (T1) 402 is not equal to the magnitude of the value of the second threshold level (T2) 404. Likewise, the magnitude of the value of the third threshold level (T3) 406 is not equal to the magnitude of the value of the fourth threshold level (T4) 408.

Figure 5A:
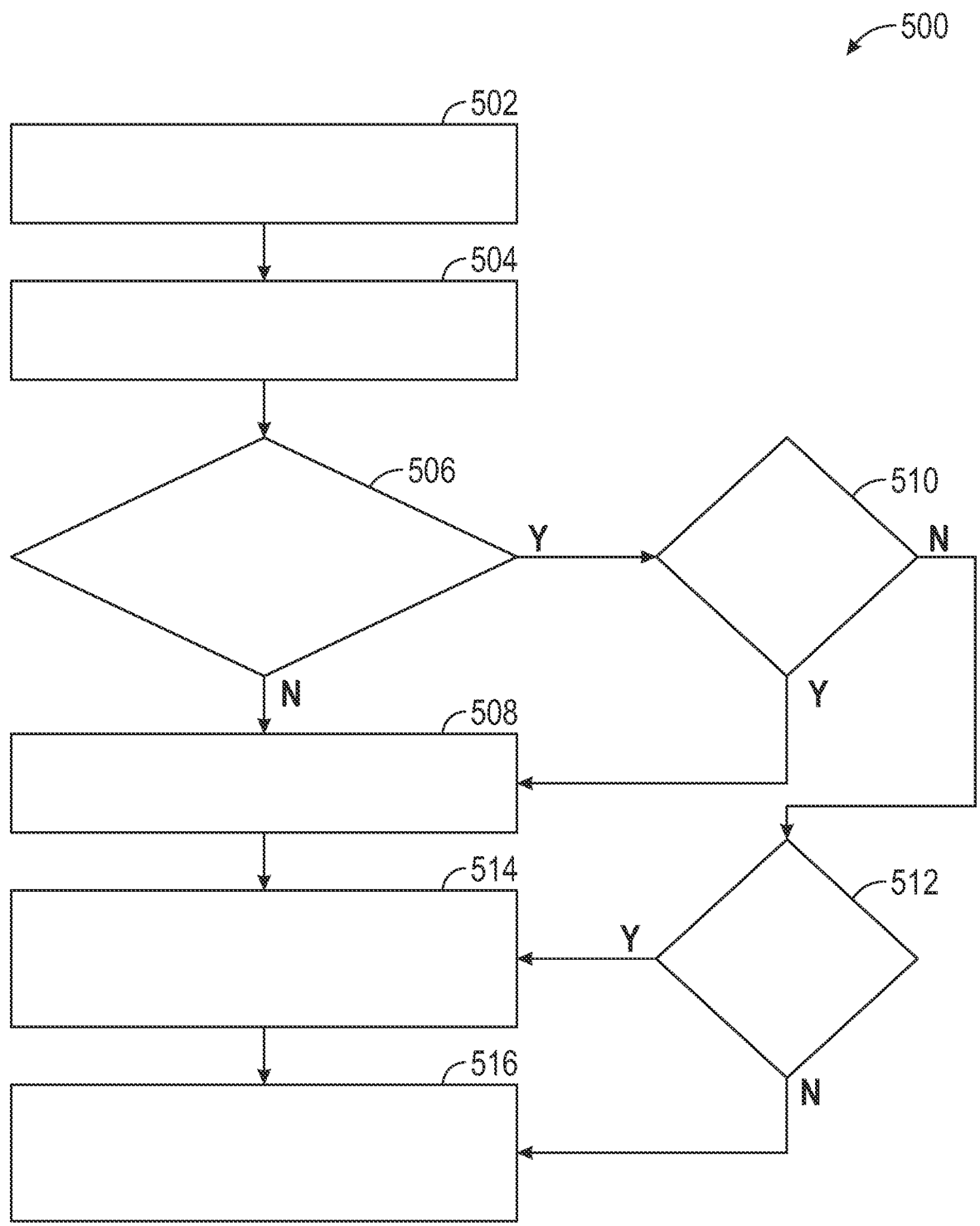
FIGS. 5A and 5B are flowchart diagrams illustrating a method for controlling the torque output of an electric motor in accordance with an exemplary embodiment.
Figure 5B:
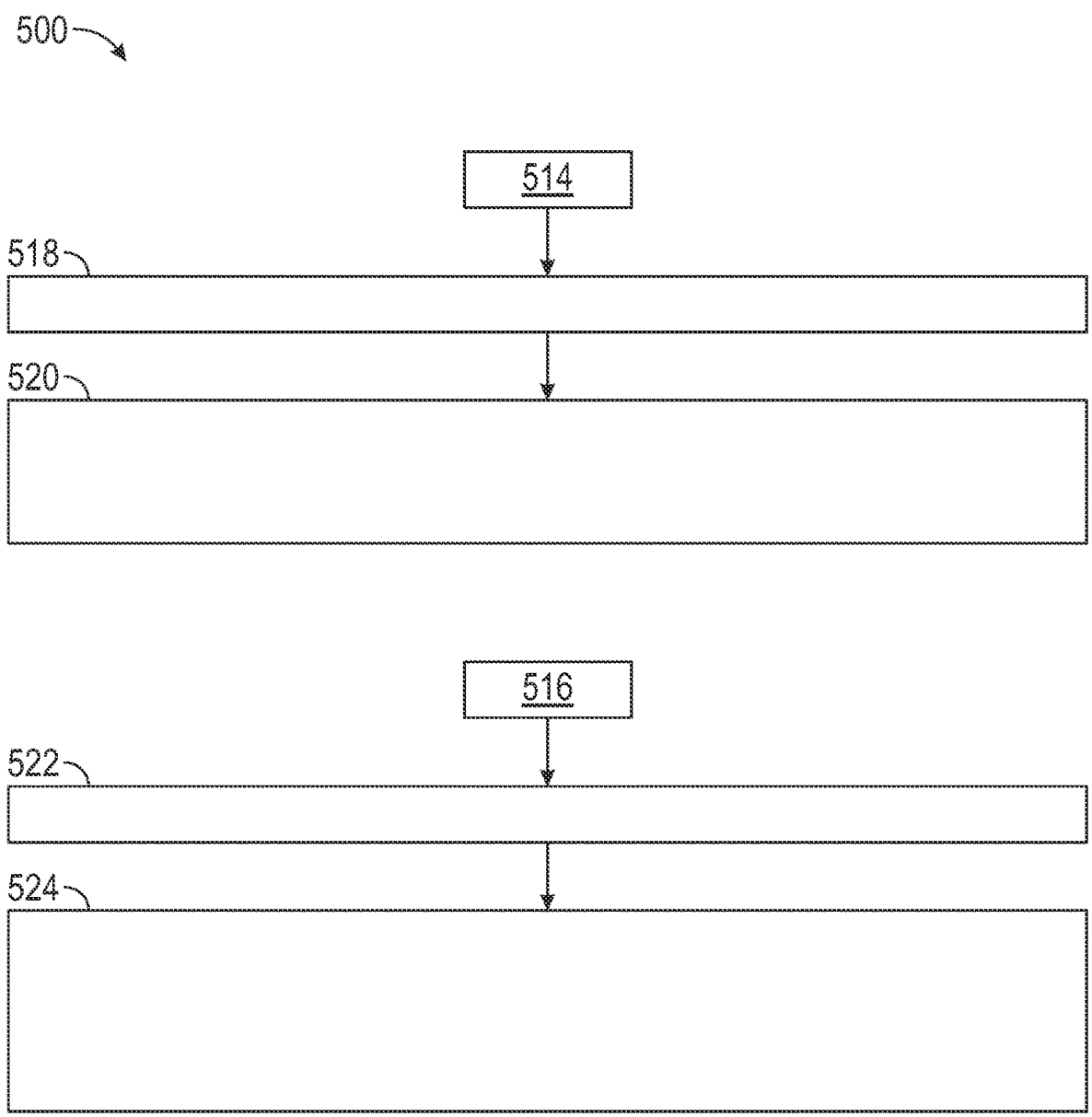

Referring now to FIGS. 5A and 5B, a flowchart illustrating a method 500 for controlling the torque output of an electric motor in accordance with an exemplary embodiment is shown. At block 502, the method 500 includes receiving a requested output torque level for the electric motor. In one embodiment, the requested output torque level is received from an accelerator of the electric vehicle. Next, at block 504, the method 500 includes obtaining a rotational speed of the electric motor. At decision block 506, the method 500 includes determining whether the rotational speed of the electric motor is within a predefined range. In exemplary embodiments, the predefined range of the rotational speed of the electric motor is associated with a gear rattle of the electric vehicle.

Based on a determination that the rotational speed of the electric motor is not within the predefined range, the method 500 proceeds to block 508 and includes instructing the electric motor to operate at a torque level equal to the requested output torque level. Based on a determination that the rotational speed of the electric motor is within the predefined range, the method 500 proceeds to decision block 510. At decision block 510, a determination is made of whether the requested torque level is greater than a first threshold lever (T1) or less than a second threshold level (T2). In exemplary embodiments, the first threshold level (T1) is greater than one newton meter and the second threshold level (T2) is less than negative one newton meter. Based on a determination that the requested torque level is greater than a first threshold level (T1) or less than a second threshold level (T2), the method 500 proceeds to block 508 and includes instructing the electric motor to operate at a torque level equal to the requested output torque level.

Based on a determination that the requested torque level is less than the first threshold level (T1) and greater than the second threshold level (T2), the method 500 proceeds to decision block 512. At decision block 512, the method 500 determines whether the requested torque level is greater than zero and less than the first threshold level (T1). Based on a determination that the requested torque level is greater than zero and less than the first threshold level (T1), the method 500 proceeds to block 514 and instructs the electric motor to operate with a torque level that is at least the first threshold level (T1). Otherwise, the method 500 proceeds to block 516 instructs the electric motor to operate with the torque level that is at most the second threshold level (T2).

In exemplary embodiments, after the electric motor has been instructed to operate at a torque that is at least the first threshold level (T1), at block 514, the method proceeds to block 518 and includes monitoring the requested output torque level for the electric motor. At block 520, the method 500 includes preventing the electric motor from operating at the torque level that is lower than the first threshold level (T1) until the requested output torque level falls below a third threshold level (T3), which is less than the second threshold level (T2). Likewise, after the electric motor has been instructed to operate at a torque that is at most the second threshold level (T2), at block 516, the method proceeds to block 522 and includes monitoring the requested output torque level for the electric motor. At block 524, the method 500 includes preventing the electric motor from operating at the torque level that is greater than the second threshold level until the requested output torque level is greater than a fourth threshold level (T4), which is greater than the first threshold level (T1).

The terms "a" and "an" do not denote a limitation of quantity, but rather denote the presence of at least one of the referenced item. The term "or" means "and/or" unless clearly indicated otherwise by context. Reference throughout the specification to "an aspect", means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects.

When an element such as a layer, film, region, or substrate is referred to as being "on" another element, it can be directly on the other element or intervening elements may also be present. In contrast, when an element is referred to as being "directly on" another element, there are no intervening elements present.

Unless specified to the contrary herein, all test standards are the most recent standard in effect as of the filing date of this application, or, if priority is claimed, the filing date of the earliest priority application in which the test standard appears.

Unless defined otherwise, technical and scientific terms used herein have the same meaning as is commonly understood by one of skill in the art to which this disclosure belongs.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A method for controlling a torque of an electric motor, the method comprising:
receiving a requested output torque level for the electric motor;
obtaining a rotational speed of the electric motor;
based on determining that the rotational speed of the electric motor is within a predefined range:
instructing the electric motor to operate at the requested output torque level based on determining that the requested output torque level is greater than a first threshold level or less than a second threshold level;
instructing the electric motor to operate with a torque level that is at least the first threshold level based on determining that the requested output torque level is less than the first threshold level and greater than zero; and
instructing the electric motor to operate with the torque level that is at most the second threshold level based on determining that the requested output torque level is greater than the second threshold level and less than zero,
wherein based on a determination that the electric motor has been instructed to operate at the torque that is at least the first threshold level, the method further comprises:
monitoring the requested output torque level for the electric motor; and
preventing the electric motor from operating at the torque level that is lower than the first threshold level until the requested output torque level falls below a third threshold level, which is less than the second threshold level.

2. The method of claim 1, wherein the first threshold level is greater than one Newton meter and the second threshold level is less than negative one Newton meter.

3. The method of claim 2, wherein an absolute value of the first threshold level is equal to the absolute value of the second threshold level.

4. The method of claim 1, further comprising instructing the electric motor to operate at the torque level equal to the requested output torque level based on determining that the rotational speed of the electric motor is not within the predefined range.

5. The method of claim 1, wherein the third threshold level is at least one Newton meter less than the second threshold level.

6. The method of claim 1, wherein based on a determination that the electric motor has been instructed to operate at the torque that is at most the second threshold level, the method further comprises:
preventing the electric motor from operating at the torque level that is greater than the second threshold level until the requested output torque level is greater than a fourth threshold level, which is greater than the first threshold level.

7. The method of claim 6, wherein the fourth threshold level is at least one Newton meter greater than the first threshold level.

8. An electric vehicle comprising:
an electric motor;
a plurality of gears that couple the electric motor to one or more wheels; and
a controller configured to operate the electric motor, wherein the controller is configured to:
receive a requested output torque level for the electric motor;
obtain a rotational speed of the electric motor;
based on determining that the rotational speed of the electric motor is within a predefined range, the controller is further configured to:
instruct the electric motor to operate at the requested output torque level based on determining that the requested output torque level is greater than a first threshold level or less than a second threshold level;
instruct the electric motor to operate with a torque level that is at least the first threshold level based on determining that the requested output torque level is less than the first threshold level and greater than zero; and
instruct the electric motor to operate with the torque level that is at most the second threshold level based on determining that the requested output torque level is greater than the second threshold level and less than zero,
wherein based on a determination that the electric motor has been instructed to operate at the torque that is at most the second threshold level the controller is further configured to:
monitor the requested output torque level for the electric motor; and
prevent the electric motor from operating at the torque level that is greater than the second threshold level until the requested output torque level is greater than a fourth threshold level, which is greater than the first threshold level.

9. The electric vehicle of claim 8, wherein the first threshold level is greater than one Newton meter and the second threshold level is less than negative one Newton meter.

10. The electric vehicle of claim 9, wherein an absolute value of the first threshold level is equal to the absolute value of the second threshold level.

11. The electric vehicle of claim 8, wherein the controller is further configured to instruct the electric motor to operate at the torque level equal to the requested output torque level based on determining that the rotational speed of the electric motor is not within the predefined range.

12. The electric vehicle of claim 8, wherein based on a determination that the electric motor has been instructed to operate at the torque that is at least the first threshold level the controller is further configured to:
prevent the electric motor from operating at the torque level that is lower than the first threshold level until the requested output torque level falls below a third threshold level, which is less than the second threshold level.

13. The electric vehicle of claim 12, wherein the third threshold level is at least one Newton meter less than the second threshold level.

14. The electric vehicle of claim 8, wherein the fourth threshold level is at least one Newton meter greater than the first threshold level.

15. A method for controlling a torque of an electric motor in an electric vehicle, the method comprising:
receiving a requested output torque level for the electric motor;
obtaining a speed of the electric vehicle;

based on determining that the speed of the electric vehicle is within a predefined range:
- instructing the electric motor to operate at the requested output torque level based on determining that the requested output torque level is greater than a first threshold level or less than a second threshold level;
- instructing the electric motor to operate with a torque level that is at least the first threshold level based on determining that the requested output torque level is less than the first threshold level and greater than zero; and
- instructing the electric motor to operate with the torque level that is at most the second threshold level based on determining that the requested output torque level is greater than the second threshold level and less than zero, wherein based on a determination that the electric motor has been instructed to operate at the torque that is at least the first threshold level, the method further comprises:

- monitoring the requested output torque level for the electric motor; and
- preventing the electric motor from operating at the torque level that is lower than the first threshold level until the requested output torque level falls below a third threshold level, which is less than the second threshold level.

16. The method of claim 15, further comprising instructing the electric motor to operate at the torque level equal to the requested output torque level based on a determination that the speed of the electric vehicle is not within the predefined range.

17. The method of claim 15, wherein based on a determination that the electric motor has been instructed to operate at the torque that is at most the second threshold level, the method further comprises:

- preventing the electric motor from operating at the torque level that is greater than the second threshold level until the requested output torque level is greater than a fourth threshold level, which is greater than the first threshold level.

* * * * *